United States Patent
Zylberberg

(10) Patent No.: US 10,765,111 B1
(45) Date of Patent: Sep. 8, 2020

(54) CRYOSOLUTIONS AND USES THEREOF

(71) Applicant: Akron Biotechnology, LLC, Boca Raton, FL (US)

(72) Inventor: Claudia Zylberberg, Delray Beach, FL (US)

(73) Assignee: Akron Biotechnology, LLC, Boca Raton, FL (US)

( * ) Notice: Subject to any disclaimer, the term of this patent is extended or adjusted under 35 U.S.C. 154(b) by 384 days.

(21) Appl. No.: 14/638,881

(22) Filed: Mar. 4, 2015

Related U.S. Application Data

(60) Provisional application No. 61/948,338, filed on Mar. 5, 2014.

(51) Int. Cl.
 *A01N 1/02* (2006.01)
(52) U.S. Cl.
 CPC .................................. *A01N 1/0221* (2013.01)
(58) Field of Classification Search
 None
 See application file for complete search history.

(56) References Cited

U.S. PATENT DOCUMENTS

| | | | |
|---|---|---|---|
| 5,699,793 A | 12/1997 | Brasile | |
| 5,723,282 A | 3/1998 | Fahy et al. | |
| 7,029,839 B2 * | 4/2006 | Toledo-Pereyra | A01N 1/02 435/1.1 |
| 2002/0110907 A1 * | 8/2002 | Wisniewski | A01N 1/02 435/307.1 |
| 2003/0012802 A1 * | 1/2003 | Arnaud-Sebillotte | A61K 8/06 424/401 |
| 2004/0043940 A1 * | 3/2004 | Bunger | A61K 8/4953 424/401 |
| 2004/0047828 A1 * | 3/2004 | Buenger | A61K 8/4953 424/70.13 |
| 2005/0019917 A1 * | 1/2005 | Toledo-Pereyra | A01N 1/02 435/375 |
| 2007/0009880 A1 * | 1/2007 | Toledo | A01N 1/02 435/1.1 |
| 2007/0079754 A1 * | 4/2007 | Hitzel | A61K 8/33 118/31.5 |

OTHER PUBLICATIONS

Higashiyam. 2002. Novel functions and applications of trehalose. Pure and Applied Chemistry, vol. 74, No. 7, pp. 1263-1269. (Year: 2002).*

Liu et al. 2011 Effect of Various Freezing Solutions on Cryopreservation of Mesenchymal Stem Cells From Different Animal Species. CryoLetters, vol. 32, No. 5, pp. 425-435. (Year: 2011).*

Dráber et al. 1995. Stability of monoclonal IgM antibodies freeze-dried in the presence of trehalose. Journal of Immunological Methods, vol. 181, pp. 37-43 (Year: 1995).*

Davis, J. et al, "Clinical toxicity of cryopreserved bone marrow graft infusion", Blood, 75:3:781-786, (1990).

Gimble, J. et al, "Adipose-derived stem cells for regenerative medicine", Circulation Research, vol. 100, pp. 1249-1260, DOI: 10.1161/01.RES.0000265074.83288.09, (2007).

* cited by examiner

*Primary Examiner* — Blaine Lankford
(74) *Attorney, Agent, or Firm* — Mintz Levin Cohn Ferris Glovsky and Popeo, P.C.; Nicholas A. Zachariades

(57) ABSTRACT

Compositions for maintaining cellular integrity especially in cases of cryopreservation and multiple freeze/thawing cycles are provided. In addition, the compositions can be used in various media for a variety of applications.

8 Claims, No Drawings

CRYOSOLUTIONS AND USES THEREOF

CROSS REFERENCE TO RELATED APPLICATIONS

In accordance with 37 C.F.R. 1.76, a claim of priority is included in an Application Data Sheet filed concurrently herewith. Accordingly, the present invention claims the benefit of priority of U.S. Provisional Patent Application No. 61/948,338, entitled "CRYOSOLUTIONS AND USES THEREOF", filed Mar. 5, 2014, and is incorporated herein by reference in its entirety.

FIELD OF THE INVENTION

Embodiments of the invention are directed to compositions for the cryopreservation of cells and tissues. Methods of use are also embodied herein.

BACKGROUND

Cryopreservation is a process where biological samples such as cells or whole tissues are preserved by cooling to low sub-zero temperatures. At such low temperatures, any biological activity, including the biochemical reactions that would normally lead to cell death, is effectively stopped. Cryopreservation has many different research and clinical applications. By way of example, there is a frequent research need to store cell or tissue samples for a period of time in a manner so as to preserve their potential for resuming biological activity, such as in the cases of cell culture samples and hybridomas. In addition, there is a frequent clinical need to preserve and to store cells while preserving their potential biological activity, such as in the case of autologous bone marrow transplants, cord blood storage, and the storage of human gametes.

SUMMARY

Embodiments are directed to compositions for maintaining cellular integrity especially in cases of cryopreservation and multiple freeze/thawing cycles. In addition, the compositions can be used in various media for a variety of applications.

In some preferred embodiments, a composition comprises polyethylene glycol (PEG), one or more saccharides, one or more organic amphoteric agents, one or more naturally occurring agents or combinations thereof. In some embodiments, the saccharide is a disaccharide. In some embodiments, the amount of saccharides present in the composition is from about 0.1 µg/ml to about 1 mg/ml of one or more saccharides. In one preferred embodiment, the saccharide is α-D-glucopyranosyl-(1→1)-α-D-glucopyranoside (trehalose) and/or dextran e.g. dextran-40.

In another preferred embodiment, the amount of organic amphoteric agents present in the composition is from about 0.1% to about 20% v/v. Preferably, the organic amphoteric agent is ectoin and/or hydroxyectoin. In some preferred embodiments, the organic amphoteric agent comprises ectoin, hydroxyectoin, ectoin derivatives, hydroxyectoin derivatives, analogs, variants or combinations thereof.

In another embodiment, the amount of polyethylene glycol present in the composition is from about 0.001% to about 20% v/v of polyethylene glycol.

In yet another embodiment, the amount of ectoin and/or hydroxyectoin present in the composition is from about 0.1% to about 20% v/v ectoin and/or hydroxyectoin.

In another embodiment, the amount of trehalose and/or dextran e.g. dextran-40, present in the composition is from about 0.1 µg/ml to about 1 mg/ml of trehalose and/or dextran e.g. dextran-40.

In yet another preferred embodiment, a composition comprises from about 0.1 µg/ml to about 1 mg/ml of a disaccharide or saccharide, from about 0.1% to about 20% v/v of an organic amphoteric agent and from about 0.001% to about 20% v/v of PEG. In one preferred embodiment, the composition comprises from about 0.1 µg/ml to about 1 mg/ml of trehalose and/or dextran e.g. dextran-40, from about 0.1% to about 20% v/v ectoin and/or hydroxyectoin and from about 0.001% to about 20% v/v of PEG.

In some embodiments, the composition optionally comprises a pharmaceutically acceptable excipient and/or naturally occurring agents or combinations thereof.

In another preferred embodiment, a biological medium comprises a cell culture medium and a composition comprising: polyethylene glycol (PEG), saccharides, organic amphoteric agents, naturally occurring agents or combinations thereof. In some embodiments, the saccharide is a disaccharide. In one preferred embodiment, the amount of saccharide present in the composition is from about 0.1 µg/ml to about 1 mg/ml of one or more saccharides; the organic amphoteric agent present in the composition is about 0.1% to about 20% v/v of one or more amphoteric agents; the amount of polyethylene glycol present in the composition is from about 0.001% to about 20% v/v.

In some embodiments, the organic amphoteric agent present in the biological medium is ectoin and/or hydroxyectoin and the disaccharide is α-D-glucopyranosyl-(1→1)-α-D-glucopyranoside (trehalose) and/or dextran e.g. dextran-40. Preferably, the amount of ectoin and/or hydroxyectoin present in the composition is from about 0.1% to about 20% v/v ectoin and/or hydroxyectoin and the amount of trehalose and/or dextran e.g. dextran-40, present in the composition is from about 0.1 µg/ml to about 1 mg/ml of trehalose and/or dextran-40.

In some embodiments, the biological medium comprises a composition comprising from about 0.1 µg/ml to about 1 mg/ml of a saccharide, from about 0.1% to about 20% v/v of an organic amphoteric agent and from about 0.001% to about 20% v/v of PEG. In one preferred embodiment, the saccharide is a disaccharide.

In another embodiment, the biological medium comprises a composition comprising from about 0.1 µg/ml to about 1 mg/ml of trehalose and/or dextran e.g. dextran-40, from about 0.1% to about 20% v/v ectoin and/or hydroxyectoin and from about 0.001% to about 20% v/v of PEG.

In another embodiment, a composition comprises a biological sample in a cryoprotective composition wherein the cryoprotective composition comprises from about 0.1 µg/ml to about 1 mg/ml of a saccharide, from about 0.1% to about 20% v/v of an organic amphoteric agent and from about 0.001% to about 20% v/v of PEG. Preferably, the cryoprotective composition comprises from about 0.1 µg/ml to about 1 mg/ml of trehalose and/or dextran-40, from about 0.1% to about 20% v/v ectoin and/or hydroxyectoin and from about 0.001% to about 20% v/v of PEG.

In another preferred embodiment, a method of cryopreserving a biological sample comprises obtaining a biological sample; contacting the biological sample with a cryopreservative composition, wherein the cryopreservative composition comprises: about 0.1 µg/ml to about 1 mg/ml of a saccharide, about 0.1% to about 20% v/v of an organic amphoteric agent and about 0.001% to about 20% v/v of PEG. Preferably, the cryopreservative composition comprises about 0.1 µg/ml to about 1 mg/ml of trehalose and/or dextran-40, about 0.1% to about 20% v/v ectoin and/or hydroxyectoin and about 0.001% to about 20% v/v of PEG.

In another preferred embodiment, a method of storing a preparation of cells or tissues in a viable condition comprising: adding a cryopreservative composition to the preparation of cells, freezing the cells, wherein the cryopreservative composition comprises: about 0.1 µg/ml to about 1 mg/ml of a saccharide, about 0.1% to about 20% v/v of an organic amphoteric agent and about 0.001% to about 20% v/v of PEG. Preferably, the cryopreservative composition comprises about 0.1 µg/ml to about 1 mg/ml of trehalose and/or dextran e.g. dextran-40, about 0.1% to about 20% v/v ectoin and/or hydroxyectoin and about 0.001% to about 20% v/v of PEG.

In another embodiment, a method of storing cells, comprises treating the cells with a solution comprising: adding a cryopreservative composition to the preparation of cells, freezing the cells, wherein the cryopreservative composition comprises: about 0.1 µg/ml to about 1 mg/ml of a saccharide, about 0.1% to about 20% v/v of an organic amphoteric agent and about 0.001% to about 20% v/v of PEG. Preferably, the cryopreservative composition comprises about 0.1 µg/ml to about 1 mg/ml of trehalose and/or dextran-40, about 0.1% to about 20% v/v ectoin and/or hydroxyectoin and about 0.001% to about 20% v/v of PEG.

In another embodiment, a kit comprises a cryopreservative composition, wherein the cryopreservative composition comprises: polyethylene glycol (PEG), disaccharides, saccharides, organic amphoteric agents, naturally occurring agents or combinations thereof.

Other aspects are described infra.

DETAILED DESCRIPTION

Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the invention may be practiced without the theoretical aspects presented. Moreover, the theoretical aspects are presented with the understanding that Applicants do not seek to be bound by the theory presented.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions

The terminology used herein is for the purpose of describing particular embodiments only and is not intended to be limiting of the invention. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used in this specification and the appended claims, the term "or" is generally employed in its sense including "and/or" unless the content clearly dictates otherwise.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value or range. Alternatively, particularly with respect to biological systems or processes, the term can mean within an order of magnitude, preferably within 5-fold, and also preferably within 2-fold, of a value. Where particular values are described in the application and claims, unless otherwise stated the term "about" meaning within an acceptable error range for the particular value should be assumed. All numeric values are herein assumed to be modified by the term "about", whether or not explicitly indicated. The recitation of numerical ranges by endpoints includes all numbers within that range (e.g., 1 to 5 includes 1, 1.5, 2, 2.75, 3, 3.80, 4, and 5).

As used herein, the phrase "cryoprotective agent" refers to a chemical or a chemical solution which facilitates the process of cryoprotection by reducing the injury of cells and tissues during freezing and thawing. The cryoprotective agent protects cells and tissues from damage associated with storage at sub-zero temperature and/or freezing, e.g., cell membrane damage due to ice crystal formation.

"Cryopreserved cells" or "cryopreserved tissues" are cells and tissues that have been preserved by cooling to a sub-zero temperature. Cryopreserved cells include eukaryotic and prokaryotic cells. Cryopreserved cells and tissues include, for example, animal, insect, bird, fish, reptile and plant cells or tissues. The compositions of the invention are, thus, cryoprotective and cryopreservative.

As used herein, the terms "cell," "cell line," and "cell culture" may be used interchangeably. All of these terms also include their progeny, which is any and all subsequent generations. It is understood that all progeny may not be identical due to deliberate or inadvertent mutations. The "cells" can be prokaryotic or eukaryotic and encompass all species, e.g. mammals, fish, birds, reptiles, insects, fungi, bacterial and the like. In the context of expressing a heterologous nucleic acid sequence, "host cell" refers to a prokaryotic or eukaryotic cell, and it includes any transformable organism that is capable of replicating a vector or expressing a heterologous gene encoded by a vector. A host cell can, and has been, used as a recipient for vectors or viruses. A host cell may be "transfected" or "transformed," which refers to a process by which exogenous nucleic acid, such as a recombinant protein-encoding sequence, is transferred or introduced into the host cell. A transformed cell includes the primary subject cell and its progeny.

As used herein, the term "exogenous nucleic acid" refers to a nucleic acid that is not normally or naturally found in and/or produced by a cell in nature, and/or that is introduced into the cell (e.g., by electroporation, transfection, infection, lipofection, or any other means of introducing a nucleic acid into a cell).

An "amphoteric" agent is one which can act either as an acid or base depending on the reaction in which they are involved. "Organic amphoteric agents" are organic molecules that contain both acidic (e.g., carboxyl) and basic (e.g., amino) functional groups. Thus, for example, an organic amphoteric agent comprises an amino group ($NH_2$) and a carboxylic group (COOH) bound to the same or different carbon atoms of a hydrocarbonic backbone whereof. Further functional groups include, for example, an amino group ($NH_2$), carboxylic group (COOH), carbonyl group (CO), hydroxy (OH) or mercapto group (SH) or aryls like phenyl. In some preferred embodiments, the organic amphoteric agent comprises ectoin, hydroxyectoin, ectoin derivatives, hydroxyectoin derivatives, analogs, variants or combinations thereof. In some embodiments, the organic amphoteric agent is ectoin and/or hydroxyectoin.

As used herein, the term "saccharide" refers to any carbohydrate comprising monosaccharides (e.g., glucose, ribose, fructose, galactose, etc.), disaccharides (e.g., sucrose, lactose, maltose, cellobiose, trehalose, dextran e.g. dextran-40, melibiose, etc.), oligosaccharides (e.g., raffinose, stachyose, amylose, etc.), and polysaccharides (e.g., starch, glycogen, cellulose, chitin, xylan, arabinoxylan, mannan, fucoidan, galactomannan, callose, laminarin, chrysolaminarin, amylopectin, dextran, dextrins, maltodextrins, inulin, oligofructose, polydextrose, etc.). The term encompasses simple carbohydrates, as well as complex carbohydrates. Indeed, it is not intended that the present invention be limited to any particular saccharide, as various saccharides and forms of saccharides find use in the present invention. In a preferred embodiment, the saccharide is trehalose and/or dextran-40.

The term "perfusion" as used herein refers to the flowing of fluid through the tissue or organ. Stated in another way, perfusion or to "perfuse" refers to supplying an organ, tissue with a fluid by circulating it through blood vessels or other natural channels. Techniques for perfusing organs and tissue are well known in the art, and are disclosed in U.S. Pat. Nos. 5,723,282 and 5,699,793 which are both incorporated herein in their entirety by reference.

The term "organ" as used herein refers to a structure of bodily tissue in a subject, e.g., a mammalian subject such as a human, wherein the tissue structure as a whole is specialized to perform a particular bodily function. Organs which are transplanted within the meaning of the present invention include for example, but without limitation, cornea, skin, heart, lung, kidney, pancreas, liver, spleen. In some embodiments, the term "organ" also encompasses decellularized and recellularized organs, as well as engineered and artificial organs and tissues, including engineered organs (e.g., tissue engineered constructs), engineered organs comprising a bioscaffold, tissues, organ slices and partial organs.

The term "viability" as used herein refers to the state of an organ's survival capability, e.g., capable of survival after transplantation into a recipient. Viability can be used as a measure of the entire organ's survival or a part of the organ, or the viability of cells within the organ. Viability of cells is also easily determined, for example, immunostaining, dye exclusion, metabolic tests etc. The term "viability" also includes reference to cells, cell cultures, tissues, etc.

A "biological medium" as used herein, is any type of medium that is used to grow, culture and maintain organs, tissues, cells etc., in vitro. A biological medium also encompasses any biocompatible agent, any pharmaceutical excipient, pharmaceutically and physiologically acceptable fluids such as water, physiological saline, balanced salt solutions, aqueous dextrose, glycerol or the like as a vehicle, tissue or organ culture media, any agent that can be administered in vivo to a subject, any agent that can be used in assays or for diluting or maintaining a biological sample, e.g. nucleic acids, peptides etc.

"Subject," as used herein, refers to an individual to whom an agent is to be delivered, e.g., for experimental, diagnostic, and/or therapeutic purposes or from whom cells have been obtained. Preferred subjects are mammals, particularly domesticated mammals (e.g., dogs, cats, etc.), primates, or humans. In certain embodiments, the subject is a human. In certain embodiments, the subject is an experimental animal such as a mouse or rat. A subject under the care of a physician or other health care provider may be referred to as a "patient."

"Pharmaceutical agent," also referred to as a "drug," or "therapeutic agent" is used herein to refer to an agent that is administered to a subject to treat a disease, disorder, or other clinically recognized condition that is harmful to the subject, or for prophylactic purposes, and has a clinically significant effect on the body to treat or prevent the disease, disorder, or condition. Therapeutic agents include, without limitation, agents listed in the United States Pharmacopeia (USP), Goodman and Gilman's The Pharmacological Basis of Therapeutics, $12^{th}$ Ed., McGraw Hill, 2001; Katzung, B. (ed.) Basic and Clinical Pharmacology, McGraw-Hill/Appleton & Lange; $8^{th}$ edition (Sep. 21, 2000); Physician's Desk Reference (Thomson Publishing), and/or The Merck Manual of Diagnosis and Therapy, $18^{th}$ ed. (2006), or the $19^{th}$ ed (2011), Robert S. Porter, MD., Editor-in-chief and Justin L. Kaplan, MD., Senior Assistant Editor (eds.), Merck Publishing Group, or, in the case of animals, The Merck Veterinary Manual, $10^{th}$ ed., Cynthia M. Kahn, B.A., M.A. (ed.), Merck Publishing Group, 2010.

Cryoprotective, Cryopreservative Compositions

Cooling cells and/or tissues to sub-zero temperatures can potentially cause significant damage to the cells and/or tissues such that biological activity cannot be resumed after elevating temperatures back to a normal level. For example, ice crystals can form which physically disrupt cell membranes, leading to cell death.

Cryopreservation or cryoprotection involves the storage of biological samples at temperatures at which biological activity effectively ceases. This allows storage of biological samples with minimal degradation of the sample and/or long-term storage of biological samples. However, traditional cryopreservation techniques are hampered by the formation of ice crystals and the increase in ionic strength of unfrozen concentrated solutions, both of which cause damage to the biological sample. One technique for maintaining the biological activity of cell samples in the context of cryopreservation is the use of dimethyl sulfoxide (DMSO) as a cryoprotective agent that functions to increase the number of cells that survive both the cooling process and the subsequent heating process. DMSO is generally used at a final concentration of 5% to 15% (v/v) (0.74 to 2.5 molal). DMSO is believed to work at least in part by disrupting the process of ice crystal formation, thereby reducing the physical disruption of cell membranes. However, DMSO is toxic and can also cause various side effects. For example, patients who receive autologous cell transplants that have been preserved in DMSO can experience side effects including headaches, nausea and skin rash. (Davis, J M et. al., *Blood*, 75(3), 1990, pp 781-786). In addition, some cell lines are adversely affected by prolonged contact with DMSO.

Another technique for maintaining the biological activity of cell samples in the context of cryopreservation is the use of glycerol as a cryoprotective agent. Glycerol is generally used at a final concentration of between 5 and 20% (v/v). Although glycerol is generally less toxic to cells than DMSO, glycerol can cause osmotic problems, especially after thawing.

Thus, there is a need in the art for the protection of cells and tissues during freezing and thawing cycles. Embodiments, herein, are directed inter alia, to compositions for maintaining cellular integrity especially in cases of cryopreservation and multiple freeze/thawing cycles.

In one preferred embodiment, a cryoprotective composition comprises one or more cryoprotective agents. In preferred embodiments, the cryoprotective agent is non-toxic to the cellular matter under the conditions at which it is used (e.g. at a particular concentration, for a particular exposure time and to cells in a medium of a particular osmolality). A cryoprotective agent may be cell permeating or non-permeating. Examples of cryoprotective agents include but are not limited to, dehydrating agents, osmotic agents and vitrification solutes (i.e., solutes that aid in the transformation of a solution to a glass rather than a crystalline solid when exposed to low temperatures). In some embodiments, a cryoprotective agent can be a naturally-occurring cryoprotective agent such as ectoin and/or hydroxyectoin. Other examples of naturally occurring agents or cryoprotectants include, without limitation, anti-freeze proteins, saccharides, ice nucleating agents, compatible solutes, sugars, polyols, glucose, sucrose, glycerol and the like. These can be isolated from nature, synthesized in the laboratory, or obtained from commercial sources. Natural sources include insects, fish, amphibians, animals, birds and plants. Most notably, Arctic and Antarctic insects, fish and amphibians.

In some embodiments, the cryopreservation agent is a simple or complex carbohydrate. In some embodiments, the cryopreservation agent comprises an aldose, a ketose, an amino sugar, a saccharide (e.g., a disaccharide, a polysaccharide, etc.), or combinations thereof. In some embodiments, the cryopreservation agent comprises sucrose, dextrose, glucose, lactose, trehalose, dextran e.g. dextran-40, arabinose, pentose, ribose, xylose, galactose, hexose, idose, monnose, mannose, talose, heptose, fructose, gluconicacid, sorbitol, mannitol, methyl α-glucopyranoside, maltose, isoascorbic acid, ascorbic acid, lactone, sorbose, glucaric acid, erythrose, threose, arabinose, allose, altrose, gulose, erythrulose, ribulose, xylulose, psicose, tagatose, glucuronicacid, gluconic acid, glucaric acid, galacturonic acid, mannuronic acid, glucosamine, galactosamine, neuraminic acid, arabinans, fructans, fucans, galactans, galacturonans, glucans, mannans, xylans, levan, fucoidan, carrageenan, galactocarolose, pectins, pectic acids, amylose, pullulan, glycogen, amylopectin, cellulose, dextran, pustulan, chitin, agarose, keratin, chondroitin, dermatan, hyaluronic acid, alginic acid, xanthan gum, starch, polyethyleneglycol, dimethyl sulfoxide, ethylene glycol, propylene glycol, propylene, glycol, polyvinvyl pyrrolidone, glycerol, polyethylene oxide, polyether, serum, or combinations thereof.

Dextrans are polysaccharides with molecular weights ≥1000 Dalton, which have a linear backbone of α-linked D-glucopyranosyl repeating units. The larger dextrans (>60,000 Da) are excreted poorly from the kidney, so remain in the blood for as long as weeks until they are metabolized. Consequently, they have prolonged antithrombotic and colloidal effects. In this family, dextran-40 (MW: 40,000 Da), has been the most popular member for anticoagulation therapy. Close to 70% of dextran-40 is excreted in urine within the first 24 hours after intravenous infusion, while the remaining 30% are retained for several more days. Three classes of dextrans can be differentiated by their structural features:

Class 1 dextrans contain the α(1→6)-linked D-glucopyranosyl backbone modified with small side chains of D-glucose branches with α(1→2), α(1→3), and α(1→4)-linkage. The class 1 dextrans vary in their molecular weight, spatial arrangement, type and degree of branching, and length of branch chains, depending on the microbial producing strains and cultivation conditions. Isomaltose and isomaltotriose are oligosaccharides with the class 1 dextran backbone structure.

Class 2 dextrans (alternans) contain a backbone structure of alternating α(1→3) and α(1→6)-linked D-glucopyranosyl units with α(1→3)-linked branches.

Class 3 dextrans (mutans) have a backbone structure of consecutive α(1→3)-linked D-glucopyranosyl units with α(1→6)-linked branches. One and two-dimensional NMR spectroscopy techniques have been utilized for the structural analysis of dextrans.

Non-limiting examples of some preferred cryoprotective agents include: $SrCl_2$, sucrose, dextran, trehalose and/or dextran-40, glycerol, polymers, polyvinylpyrrolidone, polyvinyl alcohol, dimethylsulphoxide (DMSO), 1,2-propanediol (PROH), ethylene glycol (EG), mannitol, hydroxyethyl starch (HES), monosaccharide and sugar alcohols; ectoin and/or hydroxyectoin; methylcellulose; and polyethylene glycol (PEG).

In a preferred embodiment, a composition comprises polyethylene glycol (PEG), saccharides, organic amphoteric agents, naturally occurring agents or combinations thereof. In some preferred embodiments, the organic amphoteric agent comprises ectoin, ectoin derivatives, analogs, or variants thereof. In some preferred embodiments, the organic amphoteric agent is ectoin and/or hydroxyectoin. In some preferred embodiments, the organic amphoteric agent comprises ectoin, hydroxyectoin, ectoin derivatives, hydroxyectoin derivatives, analogs, variants or combinations thereof. In some preferred embodiments, the saccharide is a disaccharide. In some preferred embodiments the disaccharide is α-D-glucopyranosyl-(1→1)-α-D-glucopyranoside (trehalose and/or dextran-40).

In some embodiments, a composition comprises dimethylsulphoxide (DMSO), 1,2-propanediol (PROH), ethylene glycol (EG), sucrose, trehalose and/or dextran e.g. dextran-40; mannitol; ectoin and/or hydroxyectoin; methylcellulose; polyethylene glycol (PEG); or combinations thereof.

In another embodiment, a composition comprises from about 0.001% to about 20% v/v of polyethylene glycol (PEG).

In some embodiments, a composition comprises from about 0.1 µg/ml to about 1 mg/ml of one or more saccharides. In a preferred embodiment, the saccharide is a disaccharide.

In some embodiments, a composition comprises from about 0.1% to about 20% of one or more organic amphoteric agents.

In some embodiments, a composition comprises from about 0.1 µg/ml to about 1 mg/ml of trehalose and/or dextran-40.

In another embodiment, a composition comprises from about 0.1% to about 20% v/v ectoin and/or hydroxyectoin.

In another embodiment, a composition comprises from about 0.1 µg/ml to about 1 mg/ml of one or more saccharides, from about 0.1% to about 20% v/v of one or more organic amphoteric agents, from about 0.001% to about 20% v/v of PEG.

In another embodiment, a composition comprises from about 0.1 µg/ml to about 1 mg/ml of one or more disaccharides, from about 0.1% to about 20% v/v of one or more organic amphoteric agents and from about 0.001% to about 20% v/v of PEG.

In another embodiment, a composition comprises from about 0.1 µg/ml to about 1 mg/ml of trehalose and/or dextran-40, from about 0.1% to about 20% v/v ectoin and/or hydroxyectoin and about 0.001% to about 20% v/v of PEG.

In another embodiment, a composition comprises cells, tissues, or organs in a solution comprising from about 0.1 µg/ml to about 1 mg/ml of a saccharide, from about 0.1% to about 20% v/v of an organic amphoteric agent and from about 0.001% to about 20% v/v of PEG.

In another embodiment, a composition comprises cells, tissues, organs in a solution comprising from about 0.1 µg/ml to about 1 mg/ml of a disaccharide, from about 0.1% to about 20% v/v of an organic amphoteric agent and from about 0.001% to about 20% v/v of PEG.

In another embodiment, a composition comprises cells, tissues, organs in a solution comprising from about 0.1 µg/ml to about 1 mg/ml of trehalose and/or dextran-40, from about 0.1% to about 20% v/v ectoin and/or hydroxyectoin and from about 0.001% to about 20% v/v of PEG.

In another embodiment, the composition further comprises one or more pharmaceutically acceptable excipients or is diluted in a pharmaceutically acceptable excipient to obtain the desired ratio of agents in the cryoprotective composition. A pharmaceutically acceptable excipient, as used herein, includes any and all solvents, dispersion media, diluents, or other liquid vehicles, dispersion or suspension aids, surface active agents, isotonic agents, thickening or emulsifying agents, preservatives, solid binders, lubricants and the like, as suited to the particular formulation desired. Remington's The Science and Practice of Pharmacy, 21$^{st}$ Edition, A. R. Gennaro, (Lippincott, Williams & Wilkins, Baltimore, Md., 2006; incorporated herein by reference) discloses various excipients used in formulating pharmaceutical compositions and known techniques for the preparation thereof. Except insofar as any conventional excipient is incompatible with a substance or its derivatives, such as by producing any undesirable biological effect or otherwise interacting in a deleterious manner with any other component(s) of the pharmaceutical composition, its use is contemplated to be within the scope of this invention.

In some embodiments, the pharmaceutically acceptable excipient is at least 95%, 96%, 97%, 98%, 99%, or 100% pure. In some embodiments, the excipient is approved for use in humans and for veterinary use. In some embodiments, the excipient is approved for use in humans by the United States Food and Drug Administration. In some embodiments, the excipient is pharmaceutical grade. In some embodiments, the excipient meets the standards of the United States Pharmacopoeia (USP), the European Pharmacopoeia (EP), the British Pharmacopoeia, and/or the International Pharmacopoeia.

In another embodiment, a composition comprises a viscosity enhancer. In certain embodiments, the viscosity enhancer is a polymer. In certain embodiments, the viscosity enhancer is a polysaccharide. In certain embodiments, the viscosity enhancer is cellulose or a cellulose derivative. In certain embodiments, the viscosity enhancer is carboxymethylcellulose. In certain embodiments, the viscosity enhancer is methyl cellulose. In certain embodiments, the viscosity enhancer is ethyl cellulose, hydroxyethylcellulose, hydroxypropylcellulose, hydroxyethyl ethylcellulose, hydroxyethylcellulose, hydroxypropylcellulose, or hydroxybutyl cellulose. Other exemplary viscosity enhancers include synthetic polymers (e.g., acrylamides, acrylates). In certain embodiments, the viscosity enhancer is a wax or fatty alcohol (e.g., cetyl alcohol).

In certain embodiments, the compositions further comprise one or more therapeutic agents, hormones, growth factors, lipids, cytokines, oligonucleotides, polynucleotides, proteins, polypeptides, peptides, small molecules, chemotherapeutic agents and the like (e.g., polyphenols, fatty alcohols).

Uses

Long-term preservation of cells, tissues and organs through cryopreservation has broad impacts in multiple fields including tissue engineering, fertility and reproductive medicine, regenerative medicine, stem cells, blood banking, animal strain preservation, clinical sample storage, transplantation medicine and in vitro drug testing. Traditional cryopreservation techniques (e.g. high glycerol/slow freezing; low glycerol/rapid freezing; and slow freezing-rapid thawing) result in significant levels of cellular injury and/or death as a result of cell shrinkage, toxicity due to the increasing concentrations of during slow freezing, and ice formation. The process of vitrification, a rapid cooling that results in a glass structure at the molecular level, eliminates ice crystal formation and results in improvement in post-thaw cell viability and function compared to the traditional freezing methods. Vitrification methods have applications including reproductive cells, stem cells, blood and tissue engineered constructs (TECs). In embodiments, the cryosolution is used in vitrification methods.

In some embodiments, the composition is cryopreservative. Thus, for example, a cell culture which is going to be frozen, the composition can be added to the biological medium in which the cell is cultured, or maintained in and the composition can be added to the medium. In some embodiments, the composition comprises 0.1 µg/ml to about 1 mg/ml of trehalose and/or dextran e.g. dextran-40, about 0.1% to about 20% v/v ectoin and/or hydroxyectoin and about 0.001% to about 20% v/v of PEG. In some preferred embodiments, the organic amphoteric agent comprises ectoin, hydroxyectoin, ectoin derivatives, hydroxyectoin derivatives, analogs, variants or combinations thereof.

In some embodiments, a biological medium comprises the cryopreservative compositions embodied herein. It is to be understood that the biological medium is any medium in which a biological sample can be added to. For example, cell culture medium, media in which assays are conducted, gels, hydrogels, etc. In some embodiments, the biological medium can comprise one or more types of medium, buffers, nutrients, and/or antibiotics. In some embodiments the biological medium comprises cell culture media. Appropriate types and concentrations of media for use with particular types of biological samples are well known in the art.

The biological sample refers to a sample comprising tissues, cells, organs, biological fluids, polypeptides, nucleic acids, or other biological substances. In some embodiments a biological sample can further comprise preservatives. In some embodiments, a sample can be obtained from a subject. In some embodiments a sample can be a diagnostic sample obtained from a subject. By way of non-limiting example, a sample can be a gamete, sperm, eggs, an embryo, a zygote, chondrocytes, red blood cells, blood, portions or fractions of blood, hepatic cells, fibroblasts, stem cells, cord blood cells, adult stem cells, induced pluripotent stem cells, autologous cells, autologous stem cells, bone marrow cells, hematopoietic cells, hematopoietic stem cells, somatic cells, germ line cells, differentiated cells, somatic stem cells, embryonic stem cells, serum, plasma, sputum, cerebrospinal fluid, urine, tears, alveolar isolates, pleural fluid, pericardial fluid, cyst fluid, tumor tissue, a biopsy, saliva, an aspirate, or combinations thereof. In some embodiments, a sample can be obtained by resection, biopsy, or egg retrieval.

In preferred embodiments, the composition prevents cryoinjury of a biological sample. For example, red blood cell (RBC) cryopreservation approaches have been established: the high glycerol/slow freezing and the low glycerol/rapid freezing techniques. The high glycerol/slow freezing technique uses 40% (w/v) glycerol with a cooling rate of about 1° C./min and storage at −80° C. The low glycerol/rapid freezing approach uses 15-20% glycerol with rapid cooling rates (60-120° C./min) by immersing samples in freezing containers into liquid nitrogen (−196° C.) or nitrogen vapor (−165° C.). However, although both RBC cryopreservation methods are considered effective, cryoinjury to RBCs still occurs during the cooling and warming processes as a result of cell shrinkage, toxicity due to the increasing concentrations of solutes during slow freezing, and intracellular ice formation (IIF) during rapid freezing.

In embodiments, the cryoprotective and cryopreservative compositions embodied herein, allow for extreme cooling and thawing rates, overcome toxicity of high cryoprotectant agent (CPA) concentrations, allow for use of small volumes of biological media and are superior to traditional cryopreservative agents.

It will be appreciated that the thawing rate of cryopreserved cells or tissues, for example, will be influenced by a variety of factors. For example, the volume of the cryopreserved cells, handling time, ambient temperature, the temperature of incubation chambers used, heat transfer properties of the container housing the cells, the volume of the cryosolution added to the cryopreserved cells, and the like may influence thawing rate. It will also be appreciated that cells in a particular sample of cryopreserved cells may not all thaw at the same rate or within the same time period. Methods for thawing cryopreserved cells are well known in the art (See, e.g., Freshney R I, Culture of Animal Cells: A Manual of Basic Technique, 4th Edition, 2000, Wiley-Liss, Inc., Chapter 19).

The cryopreserved cells to be thawed may be in a composition that occupies a volume of about 0.1 ml, 0.5 ml, 1 ml, about 2 ml, about 3 ml, about 4 ml, about 5 ml, about 10 ml, about 20 ml, about 30 ml, about 40 ml, about 50 ml, about 100 ml, about 200 ml, about 300 ml, about 400 ml, about 500 ml, about 1 L, or more. The cryopreserved cells may be in a composition that occupies a volume ranging from about 0.1 ml, 0.5 ml, 1 ml to about 10 ml, from about 10 ml to about 20 ml, from about 20 ml to about 30 ml, from about 30 ml to about 40 ml, from about 40 ml to about 50 ml, from about 50 ml to about 100 ml, from about 100 ml to about 200 ml, from about 200 ml to about 300 ml, from about 300 ml to about 400 ml, from about 400 ml to about 500 ml, or from about 500 ml to about 1 L. The composition comprising the cells may be a tissue, e.g., a blood sample, a fat sample. The composition comprising the cells may further comprise other agents, e.g., cryoprotective agents such as glycerol, DMSO, sucrose, or Trehalose and/or dextran-40.

Typically, the step of thawing involves obtaining cryopreserved cells from storage at a temperature of less than about 0° C. (a subzero temperature) and allowing them to thaw to a temperature above 0° C. The step of thawing may involve obtaining the cryopreserved cells from storage at a temperature that ranges from about −205° C. to about −195° C. The step of thawing may involve obtaining the cryopreserved cells from storage at a temperature that ranges from about −80° C. to about −60° C. The step of thawing may involve progressively warming the cryopreserved cells by transferring the cells among incubators each having a warmer temperature range, e.g., to control the rate of thawing. For example, the step of thawing may involve first obtaining cryopreserved cells from storage at a first subzero temperature, e.g., that ranges from about −205° C. to about −195° C., and transferring the cryopreserved cells to a second, typically warmer, yet typically subzero, storage temperature, e.g., to a temperature that ranges from about −80° C. to about −60° C., prior to thawing. Any number of stages, for example, 2, 3, 4, 5, 6, or more stages, is envisioned to control the rate of thawing in this manner. The step of thawing may also involve progressively warming the cryopreserved cells by incubating the cells in a temperature controlled chamber, e.g., a water bath, heat block, oven, etc., and progressively warming the chamber, e.g., at a controlled rate, while the cryopreserved cells are present in the chamber.

The step of thawing may involve incubating the cryopreserved cells at a temperature that ranges from about 15° C. to about 30° C. The step of thawing may involve incubating the cryopreserved cells at a temperature that ranges from about 30° C. to about 45° C. Such incubation may be performed by incubating a container housing the cryopreserved cells in temperature controlled incubator, e.g., a temperature controlled water bath, a temperature controlled oven, etc. Other incubation methods will be apparent to the skilled artisan.

The step of thawing may be completed within about 30 seconds, about 1 minute, about 2 minutes, about 3 minutes, about 4 minutes, about 5 minutes, about 10 minutes, about 20 minutes, about 30 minutes, about 40 minutes, about 50 minutes, about 1 hour, or more. The step of thawing may be completed within a range of about 1 minute to about 5 minutes. The step of thawing may be completed within a range of about 5 minutes to about 10 minutes. The step of thawing may be completed within a range of about 10 minutes to about 30 minutes. The step of thawing may be completed within a range of about 30 minutes to about 60 minutes.

The step of thawing may involve warming the cryopreserved cells at a rate of about 1° C. per minute, about 2° C. per minute, about 3° C. per minute, about 4° C. per minute, about 5° C. per minute, about 10° C. per minute, about 20° C. per minute, about 30° C. per minute, about 40° C. per minute, about 50° C. per minute, about 60° C. per minute, about 70° C. per minute, about 80° C. per minute, about 90° C. per minute, about 100° C. per minute, about 200° C. per minute, or more. The step of thawing may involve warming the cryopreserved cells at a rate ranging from about 1° C. per minute to about 5° C. per minute. The step of thawing may involve warming the cryopreserved cells at a rate ranging from about 5° C. per minute to about 25° C. per minute. The step of thawing may involve warming the cryopreserved cells at a rate ranging from about 25° C. per minute to about 50° C. per minute. The step of thawing may involve warming the cryopreserved cells at a rate ranging from about 50° C. per minute to about 100° C. per minute. The step of thawing may involve warming the cryopreserved cells at a rate ranging from about 100° C. per minute to about 200° C. per minute. The rate of thawing may be continuous, e.g., constant rates until cells are completely thawed. The rate of thawing may also be discontinuous, e.g., the rate may be more rapid at some temperature ranges relative to the rate at other temperature ranges during thawing, for example, the rate may be more rapid in the range of about −200° C. to about 0° C. than in the range of about 0° C. to about 45° C. during the thawing.

Although not required or necessary, the cells may be washed at any stage during the cryopreservation process. In certain embodiments, the cells are washed after harvesting. In certain embodiments, the cells are washed after thawing. In certain embodiments, the cells are washed before transplantation. Such washing may prevent or minimize any cellular debris from the cryopreservation process. The washing of cells may be performed using any known methods in the art. For example, the cells may be washed with normal saline or another suitable wash solution. In certain embodiments, the volume of wash solution used is at least equal to the volume of cells being washed. The washing may involve suspending the cells in the wash solution and then centrifuging the cells to collect the washed cells. In other embodiments, the cells are centrifuged without adding any wash solution, and the cell pellet is resuspended in normal saline or another suitable solution for further use such as transplantation. The step of washing may be performed once or multiple times. In certain embodiments, the wash step may be repeated two, three, four, five, six, seven, or more times. Typically, the wash step is not performed more than two to three times. In certain embodiments, only a single wash is performed.

When freezing cells, the concentration of the cells which are to be cryopreserved may vary depending on a variety of factors, including, for example, the type of cell or tissue, the downstream application, etc. The concentration of certain cell types may be low, e.g., for oocytes the concentration may be as low as about 1-30 cells per ml, or lower. The concentration of cells may be about $10^0$ cells/ml, about $10^1$ cells/ml, about $10^2$ cells/ml, about $10^3$ cells/ml, about $10^4$ cells/ml, about $10^5$ cells/ml, about $10^6$ cells/ml, about $10^7$ cells/ml, about $10^8$ cells/ml, about $10^9$ cells/ml, or more. The concentration of cells may range from about $10^0$ cells/ml to about $10^{10}$ cells/ml, from about $10^0$ cells/ml to about $10^1$ cells/ml, from about $10^1$ cells/ml to about $10^2$ cells/ml, from about $10^2$ cells/ml to about $10^3$ cells/ml, from about $10^3$ cells/ml to about $10^4$ cells/ml, from about $10^4$ cells/ml to about $10^5$ cells/ml, from about $10^5$ cells/ml to about $10^6$ cells/ml, from about $10^6$ cells/ml to about $10^7$ cells/ml, from about $10^7$ cells/ml to about $10^8$ cells/ml, or from about $10^8$ cells/ml to about $10^9$ cells/ml, for example.

The methods and compositions disclosed herein may be used with any cryopreserved cells, typically eukaryotic cells. However, the methods and compositions disclosed herein are also envisioned for use with prokaryotic cells. The methods and compositions disclosed herein are also useful with plant cells, insect cells, etc.

Cells may be primary cells isolated from any tissue or organ (e.g., connective, nervous, muscle, fat or epithelial tissue). The cells may be mesenchymal, ectodermal, or endodermal. Cells may also be present in isolated connective, nervous, muscle, fat or epithelial tissue, e.g., a tissue explant, e.g., an adipose tissue obtained by liposuction. The connective tissue may be, for example, bone, ligament, blood, cartilage, tendon, or adipose tissue. The muscle tissue may be vascular smooth muscle, heart smooth muscle, or skeletal muscle, for example. The epithelial tissue may be of the blood vessels, ducts of submandibular glands, attached gingiva, dorsum of tongue, hard palate, esophagus, pancreas, adrenal glands, pituitary glands, prostate, liver, thyroid, stomach, small intestine, large intestine, rectum, anus, gallbladder, thyroid follicles, ependyma, lymph vessel, skin, sweat gland ducts, mesothelium of body cavities, ovaries, Fallopian tubes, uterus, endometrium, cervix (endocervix), cervix (ectocervix), vagina, labia majora, tubuli recti, rete testis, ductuli efferentes, epididymis, vas deferens, ejaculatory duct, bulbourethral glands, seminal vesicle, oropharynx, larynx, vocal cords, trachea, respiratory bronchioles, cornea, nose, proximal convoluted tubule of kidney, ascending thin limb of kidney, distal convoluted tubule of kidney, collecting duct of kidney, renal pelvis, ureter, urinary bladder, prostatic urethra, membranous urethra, penile urethra, or external urethral orifice, for example.

The cells may be any mammalian cells. The cells may be any human cells. The cells comprise: lymphocytes, B cells, T cells, cytotoxic T cells, natural killer T cells, regulatory T cells, T helper cells, myeloid cells, granulocytes, basophil granulocytes, eosinophil granulocytes, neutrophil granulocytes, hypersegmented neutrophils, monocytes, macrophages, reticulocytes, platelets, mast cells, thrombocytes, megakaryocytes, dendritic cells, thyroid cells, thyroid epithelial cells, parafollicular cells, parathyroid cells, parathyroid chief cells, oxyphil cells, adrenal cells, chromaffin cells, pineal cells, pinealocytes, glial cells, glioblasts, astrocytes, oligodendrocytes, microglial cells, magnocellular neurosecretory cells, stellate cells, boettcher cells; pituitary cells, gonadotropes, corticotropes, thyrotropes, somatotrope, lactotrophs, pneumocyte, type I pneumocytes, type II pneumocytes, Clara cells; goblet cells, alveolar macrophages, myocardiocytes, pericytes, gastric cells, gastric chief cells, parietal cells, goblet cells, paneth cells, G cells, D cells, ECL cells, I cells, K cells, S cells, enteroendocrine cells, enterochromaffin cells, APUD cell, liver cells, hepatocytes, Kupffer cells, bone cells, osteoblasts, osteocytes, osteoclast, odontoblasts, cementoblasts, ameloblasts, cartilage cells, chondroblasts, chondrocytes, skin cells, hair cells, trichocytes, keratinocytes, melanocytes, nevus cells, muscle cells, myocytes, myoblasts, myotubes, adipocyte, fibroblasts, tendon cells, podocytes, juxtaglomerular cells, intraglomerular mesangial cells, extraglomerular mesangial cells, kidney cells, kidney cells, macula densa cells, spermatozoa, sertoli cells, leydig cells, oocytes, and mixtures thereof.

The cells may also be isolated from a diseased tissue, e.g., a cancer. Accordingly, the cells may be cancer cells. For example, the cells may be isolated or derived from any of the following types of cancers: breast cancer; biliary tract cancer; bladder cancer; brain cancer including glioblastomas and medulloblastomas; cervical cancer; choriocarcinoma; colon cancer; endometrial cancer; esophageal cancer; gastric cancer; hematological neoplasms including acute lymphocytic and myelogenous leukemia; T-cell acute lymphoblastic leukemia/lymphoma; hairy cell leukemia; chronic myelogenous leukemia, multiple myeloma; AIDS-associated leukemias and adult T-cell leukemia/lymphoma; intraepithelial neoplasms including Bowen's disease and Paget's disease; liver cancer; lung cancer; lymphomas including Hodgkin's disease and lymphocytic lymphomas; neuroblastomas; oral cancer including squamous cell carcinoma; ovarian cancer including those arising from epithelial cells, stromal cells, germ cells and mesenchymal cells; pancreatic cancer; prostate cancer; rectal cancer; sarcomas including leiomyosarcoma, rhabdomyosarcoma, liposarcoma, fibrosarcoma, and osteosarcoma; skin cancer including melanoma, Merkel cell carcinoma, Kaposi's sarcoma, basal cell carcinoma, and squamous cell cancer; testicular cancer including germinal tumors such as seminoma, non-seminoma (teratomas, choriocarcinomas), stromal tumors, and germ cell tumors; thyroid cancer including thyroid adenocarcinoma and medullar carcinoma; and renal cancer including adenocarcinoma and Wilms' tumor.

The cells may comprise cord-blood cells, stem cells, umbilical cells, amniotic cells, embryonic stem cells, adult stem cells, cancer stem cells, progenitor cells, autologous cells, isograft cells, allograft cells, xenograft cells, bone marrow cells or genetically engineered cells. The cells may be induced progenitor cells. The cells may be cells isolated from a subject, e.g., a donor subject, which have been transfected with a stem cell associated gene to induce pluripotency in the cells. The cells may be cells which have been isolated from a subject, transfected with a stem cell associated gene to induce pluripotency, and differentiated along a predetermined cell lineage. The cells may be cells comprising a vector expressing a desired product. These or any other types of cells may be used for transplantation or administration to a subject in need of therapy.

Cells lines of any of the cells disclosed herein may also be used with the methods disclosed herein.

Transplantation: The invention provides methods of transplanting cells in a subject. The cells or tissues may be autologous, haplotyped matched, transformed cells, allogeneic, xenogeneic, cells expressing a desired product or combinations thereof. The methods typically involve thawing cryopreserved cells which have been frozen in the cryoprotective compositions embodied herein and transplanting the thawed cells in the subject. The method may involve obtaining the cells from a donor that is not the transplant recipient, e.g., for use as an allograft, isograft, or xenograft. The methods may involve obtaining the cells from the subject who is the transplant recipient for use as an autograft. The methods may involve expanding the cells in vitro prior to transplanting. The cells may be cryopreserved while situated in a tissue. The cells may be isolated from a tissue and then cryopreserved. The cells may be cryopreserved while situated in a tissue and isolated from the tissue following thawing.

The resulting cryocell composition may be further processed before implantation into a subject. For example, the cells may be washed, purified, extracted, expanded, or otherwise treated before implantation into a subject.

The cryopreserved cells may be thawed and seeded in a scaffold material that allows for attachment of cells and facilitates production of an engineered tissue. In one embodiment, the scaffold is formed of synthetic or natural polymers, although other materials such as hydroxyapatite, silicone, and other inorganic materials can be used. The scaffold may be biodegradable or non-degradable. Representative synthetic non-biodegradable polymers include ethylene vinyl acetate and polymethacrylate. Representative biodegradable polymers include polyhydroxyacids such as polylactic acid and polyglycolic acid, polyanhydrides, polyorthoesters, and copolymers thereof. Natural polymers include collagen, hyaluronic acid, and albumin. Hydrogels are also suitable. Other hydrogel materials include calcium alginate and certain other polymers that can form ionic hydrogels that are malleable and can be used to encapsulate cells.

The scaffolds are used to produce new tissue, such as vascular tissue, bone, cartilage, fat, muscle, tendons, and ligaments. The scaffold is typically seeded with the cells; the cells are cultured; and then the scaffold implanted. Applications include the repair and/or replacement of organs or tissues, such as blood vessels, cartilage, joint linings, tendons, or ligaments, or the creation of tissue for use as "bulking agents", which are typically used to block openings or lumens, or to shift adjacent tissue, as in treatment of reflux.

Besides adipocytes, fat tissue has been found to be a source of stem cells (Gimble et al., "Adipose-Derived Stem Cells for Regenerative Medicine" *Circulation Research* 100: 1249-1260, 2007; incorporated herein by reference). Therefore, compositions embodied herein, are useful in stabilizing and preventing damage to stem cells or other cells derived from fat tissue following cryopreservation. In certain embodiments, the compositions are useful in the transplantation of adult stem cells. In certain embodiments, the compositions are useful in the transplantation of fibroblasts.

In certain embodiments, a cryoprotective composition further comprises a viscosity enhancer. In certain embodiments, the viscosity enhancer is a polymer. In certain embodiments, the viscosity enhancer is a polysaccharide. In certain embodiments, the viscosity enhancer is cellulose or a cellulose derivative. In certain embodiments, the viscosity enhancer is carboxymethylcellulose. In certain embodiments, the viscosity enhancer is methyl cellulose. In certain embodiments, the viscosity enhancer is ethyl cellulose, hydroxyethylcellulose, hydroxypropylcellulose, hydroxyethyl ethylcellulose, hydroxyethylcellulose, hydroxypropylcellulose, or hydroxybutyl cellulose. Other exemplary viscosity enhancers include synthetic polymers (e.g., acrylamides, acrylates). In certain embodiments, the viscosity enhancer is a wax or fatty alcohol (e.g., cetyl alcohol).

The cryopreserved cells may be used for any appropriate downstream application, e.g., research, tissue culture, drug discovery, biologics production, etc. The cells may be used for microscopy, e.g., in combination with immunostaining, in situ hybridization, etc. The cells may be used for functional studies such as gene knockdown or overexpression studies. The cells may be used to study various molecular pathways, e.g., cell cycle, cell signaling, gene regulatory, etc. The cells may be separated by flow cytometry. The cells may be used to create cell lines. The cells may be used for fractionation studies, e.g., to purify proteins or molecules from different cellular compartments. The cells may be used for studying different disease pathways, e.g., cancer. The cells may be transplanted into an animal model, e.g., to study tumor growth. The cells may be used for gene, e.g., mRNA or miRNA, profiling studies. The karyotype or genotype of the cells may be evaluated. The cells may be used for isolation of various biomolecules, e.g., antibodies, proteins, RNA, DNA, ligands, etc.

The cells may be used for automated microscopy for high-content screening, e.g., for lead identification and compound characterization. The cells may be used for the evaluation, e.g., by screening, e.g., high-throughput screening, of compounds, e.g., small-molecules, siRNAs, peptides, etc., for a desired activity, e.g., inhibition of cell growth, modulation of a particular biochemical pathway, modulation of the expression of a certain gene, binding to a target, etc.

The cells may be used in a biopharmaceutical context for the production and isolation of therapeutic molecules, e.g., antibodies, enzymes, etc. The cells may be shipped, e.g., on dry ice in the presence of a polymer, e.g., a polyether, to a customer, collaborator, etc. The cells may be evaluated for contamination, e.g., bacterial, mycoplasmal, viral, etc. The uses disclosed herein are not intended to be limiting and a variety of other uses for the cryopreserved cells are also envisioned and will be apparent to the skilled artisan.

In other embodiments, the cryopreservative compositions may be used for the cryopreservation of organs, or for the transport of organs under temperatures suitable for the maintenance of viability of the organ for use in organ transplants and organ donor programs. For the cryopreservation of organs, the organ may be perfused with the cryoprotective compositions and frozen under conditions which preserve the viability of the organ. Procedures for thawing the organs for transplantation are known to those of skill in the art.

Kits

The invention also provides packages or kits, comprising one or more agents, for example, polyethylene glycol (PEG), saccharides, disaccharides, organic amphoteric agents, naturally occurring agents or combinations thereof. The agents may be in a form ready for mixing or can be premixed, or in concentrated form whereby the user dilutes the concentrated form to predetermined specifications. In some embodiments, the organic amphoteric agent is ectoin and/or hydroxyectoin. In some preferred embodiments, the organic amphoteric agent comprises ectoin, hydroxyectoin, ectoin derivatives, hydroxyectoin derivatives, analogs, variants or combinations thereof. In some embodiments, the disaccharide is α-D-glucopyranosyl-(1→1)-α-D-glucopyranoside (trehalose) and/or dextran-40. The kit may also contain one or more diluents, for example, pharmaceutically acceptable excipients, distilled water, saline, biological media, etc.

The kit may also contain instructions for diluting or mixing the agents. The instructions may also include information regarding the contacting of the biological sample with the composition for freezing. Instructions may also include thawing the cryopreserved cells. Such instructions may also include information relating to administration of cells, tissues etc. that had been cryopreserved and thawed.

The kit can also include a notice associated with the container, typically in a form prescribed by a government agency regulating the manufacture, use, or sale of medical devices and/or pharmaceuticals, whereby the notice is reflective of approval by the agency of the compositions, for human or veterinary administration in tissue transplantation.

The kit may include a device or receptacle for preparation of the composition. The device may be, e.g., a measuring or mixing device.

The kit may also optionally include a device for administering the composition of the invention. Exemplary devices include specialized syringes, needles, and catheters that are compatible with a variety of laryngoscope designs.

EXAMPLES

The invention has been described in detail with reference to preferred embodiments thereof. However, it will be appreciated that those skilled in the art, upon consideration of this disclosure, may make modifications and improvements within the spirit and scope of the invention. The following non-limiting examples are illustrative of the invention.

Compositions for cryoprotective solutions are shown in Tables 1 and 2.

TABLE 1

Cryoprotectant solutions with Ectoin and/or hydroxyectoin, PEG and Trehalose and/or dextran-40 along with Glycerol as a control.

| Solution | Extoin and/or hydroxyectoin (% v/v) | PEG (% v/v) | Trehalose and/or dextran-40 (μg/ml) | Glycerol |
|---|---|---|---|---|
| 1 | 2.5 | 0.0 | 25.0 | 0.0 |
| 2 | 5.0 | 0.0 | 25.0 | 0.0 |
| 3 | 7.5 | 0.0 | 25.0 | 0.0 |
| 4 | 10.0 | 0.0 | 25.0 | 0.0 |
| 5 | 0.0 | 2.5 | 25.0 | 0.0 |
| 6 | 0.0 | 5.0 | 25.0 | 0.0 |
| 7 | 0.0 | 7.5 | 25.0 | 0.0 |
| 8 | 0.0 | 10.0 | 25.0 | 0.0 |
| Control | 0.0 | | | 20. |

TABLE 2

| Solution | Ectoin and/or hydroxyectoin (% v/v) | PEG (% v/v) | Trehalose and/or dextran-40 (μg/ml) | Glycerol |
|---|---|---|---|---|
| 1 | 1.0 | 9.0 | 25.0 | 0.0 |
| 2 | 2.5 | 7.5 | 25.0 | 0.0 |
| 3 | 5.0 | 5.0 | 25.0 | 0.0 |
| 4 | 7.5 | 2.5 | 25.0 | 0.0 |
| 5 | 9.0 | 1.0 | 25.0 | 0.0 |
| Control | 0.0 | 0.0 | 0.0 | 20.0 |

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments.

All documents mentioned herein are incorporated herein by reference. All publications and patent documents cited in this application are incorporated by reference for all purposes to the same extent as if each individual publication or patent document were so individually denoted. By their citation of various references in this document, Applicants do not admit any particular reference is "prior art" to their invention.

What is claimed:

1. A composition for cryopreservation consisting of: polyethylene glycol (PEG), a saccharide, and an organic amphoteric agent, wherein the polyethylene glycol is present in the composition from 0.001% to 20% v/v, the saccharide is present in the composition from 0.1 μg/ml to 1 mg/ml and the organic amphoteric agent is present in the composition from 0.1% to 20% v/v, wherein:
   said organic amphoteric agent is ectoin and/or hydroxyectoin;
   said saccharide is trehalose and/or dextran-40;
   said composition being added to a biological medium.

2. The composition of claim 1, wherein the composition consists of from 0.1 μg/ml to 0.9 mg/ml of trehalose and/or dextran-40, from 0.1% to 20% v/v ectoin and/or hydroxyectoin and from 0.001% to 20% v/v of PEG.

3. The composition of claim 1, wherein the composition comprises from 0.1 μg/ml to 800 μg/ml of trehalose.

4. The composition of claim 1, wherein the composition comprises from 0.1 μg/ml to 700 μg/ml of trehalose.

5. The composition of claim 1, wherein the composition comprises from 0.1 µg/ml to 500 µg/ml of trehalose.

6. The composition of claim 1, wherein the composition comprises from 0.1 µg/ml to 250 µg/ml of trehalose.

7. The composition of claim 1, wherein the composition comprises from 0.1 µg/ml to 100 µg/ml of trehalose.

8. The composition of claim 1, wherein the composition comprises from 0.1 µg/ml to 50 µg/ml of trehalose.

* * * * *